Patented May 3, 1927.

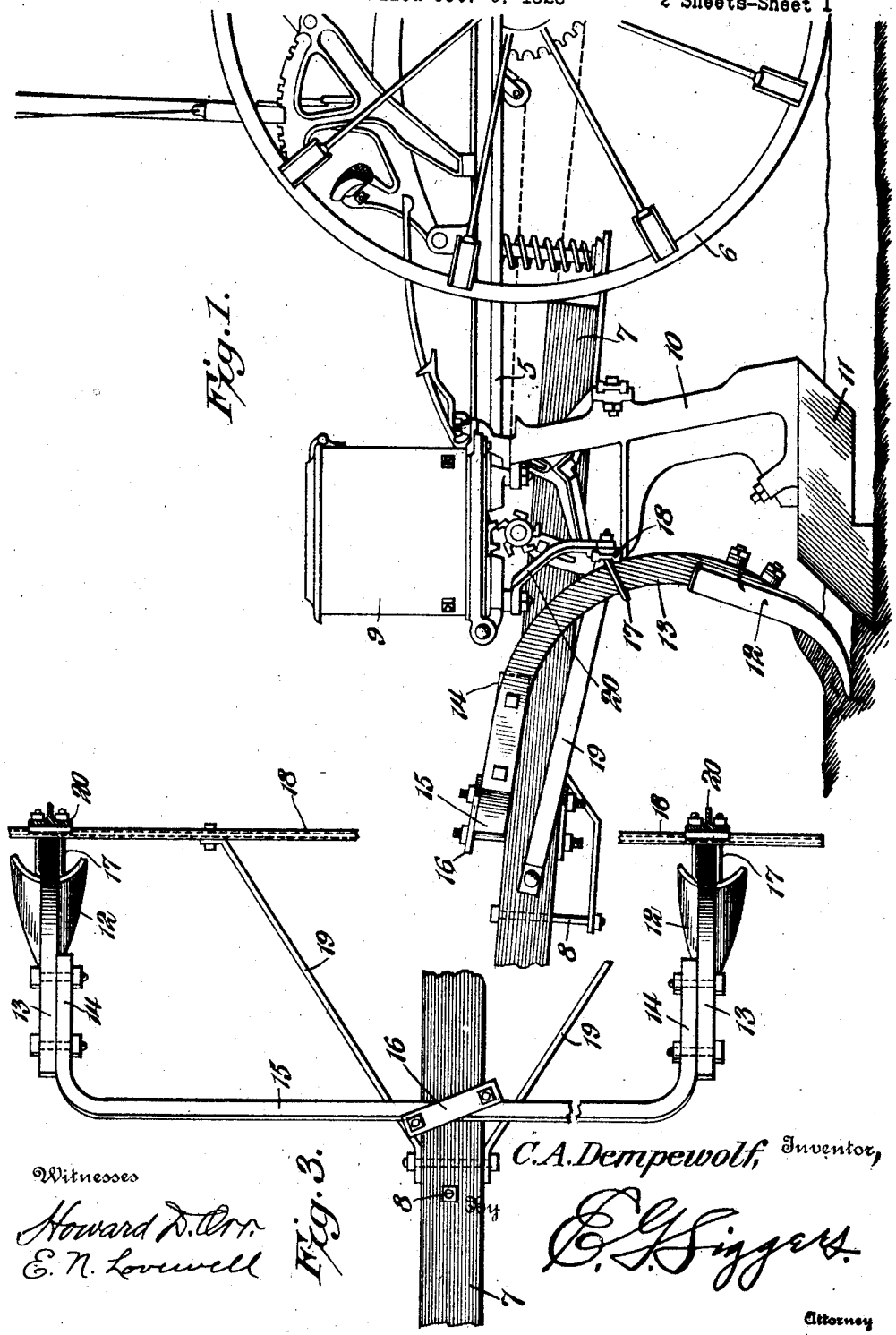

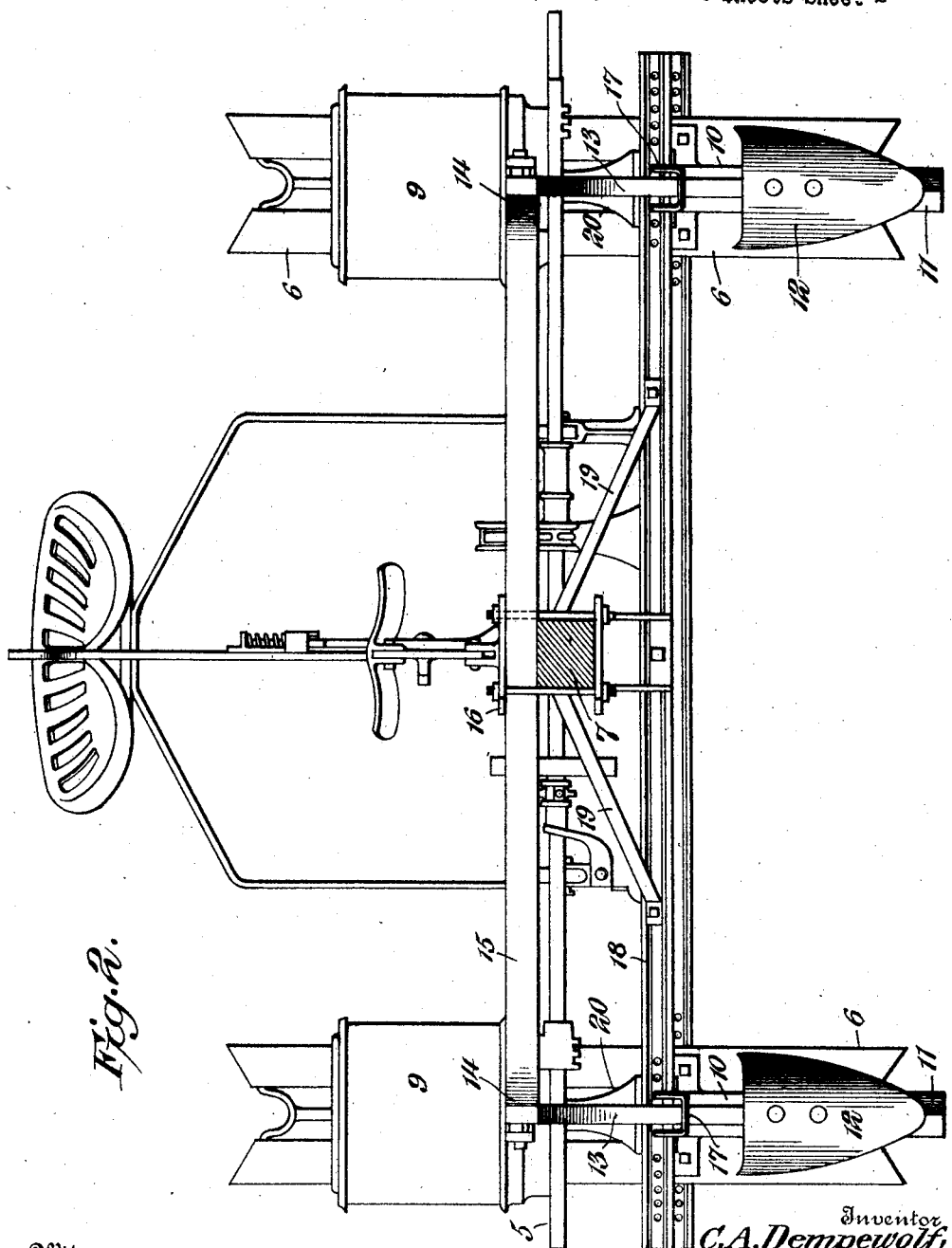

1,627,017

UNITED STATES PATENT OFFICE.

CARL ADOLPH DEMPEWOLF, OF HENDERSON, KENTUCKY.

PLANTER.

Application filed October 9, 1926. Serial No. 140,662.

This invention relates to planters of the type adapted to be used in planting corn, soy beans, and similar crops which are grown in rows.

In using planters of this type as commonly constructed, farmers have usually experienced considerable trouble due to the fact that many stalks, stubbles or vines, which have been left from the preceding year to be plowed under, have not been fully covered, or have not been covered deeply enough, with the result that they are caught by the runner, clogged up in front of the same, and prevent the seed from being covered.

The primary object of the present invention is to obviate the above-mentioned conditions by providing plows, which are independently supported by the tongue and frame in front of the respective runners. Thus, the runners penetrate the ground separately from the furrow openers, and consequently do not collect any trash. The seed is planted and covered in the bottom of the furrow at a uniform depth. This results in a better stand than can be obtained with the drills hitherto used. It promotes a better growth in a dry season, because of the fact that the seed is planted in a furrow and receives more moisture. No clods are left to prevent the seed from coming through. The roots are set deeper, and there is not so much damage from wind storms.

The specific construction of the invention and the advantages resulting therefrom will be more fully explained in connection with the accompanying drawings, which illustrate the same in its preferred form.

In the drawings:

Figure 1 is a side elevation of a portion of a planter having the invention embodied therein.

Figure 2 is a front elevation of the same.

Figure 3 is a plan view of a portion of the invention with parts broken away.

The invention, in its present embodiment, is associated with a frame 5, mounted on the usual planter wheels 6 and having a draft tongue 7 connected therewith, and provided at 8 with means for attaching a whiffletree bar to the underside thereof. On each side of the frame 5, there is mounted a seed box 9, from which a drill tube 10 leads downwardly. A runner 11 is attached to the lower end of each drill tube 10 for the purpose of opening a drill to receive the corn, or other seed to be planted.

In front of each runner 11 is a plow point 12, secured to an upwardly and forwardly curved shank 13, which is secured independently in front of the drill tube and runner, and spaced therefrom. The means for securing and supporting the plows 12 includes a cross bar 15, secured to the tongue 7 by a clip 16, or other suitable means, and having rearwardly curved ends 14 to which the forward upper ends of the shanks 13 are bolted, or otherwise secured. The intermediate portion of each shank 13 is held by a U-bolt 17, which is secured to a second cross bar 18. This second cross bar is braced from the tongue 7 by hounds 19, and is supported from the frame 5 by bars or brackets 20.

The planter may be provided with the usual mechanism for dropping the seed, but since this mechanism constitutes no part of the present invention, it is not deemed necessary to describe it specifically.

It will be noted that a plow 12 is mounted in front of each runner 11, and spaced therefrom. As the planter travels forwardly, the plow forms a furrow in which the seed is to be planted. This plow cuts through the ground, and disposes of the trash in front of the runner, so that there is none left to interfere with the proper planting of the seed. Each runner 11 is lower than the point of the plow which precedes it, and the seed is planted in the bottom of the furrow left by the plow. This is of special advantage in a dry season, because the seed receives more moisture than when planted in the usual way, and the roots are set deeper, so that the plants are not as liable to suffer from wind storms. It is also to be noted that the draft is applied beneath the tongue and close to the plows, so that a direct pull is obtained and there is little weight on the necks of the draft animals.

While I have shown and described the preferred construction of the invention, it is, of course, to be understood that the arrangement may be considerably modified without any material departure from the salient features of the invention as claimed.

What is claimed is:

In a planter, the combination of a wheeled frame, a plurality of drill tubes supported by the frame, means for supplying seed to the drill tubes, a runner secured to the lower end of each drill tube, plows located in front of the respective runners and spaced therefrom, each plow having an upwardly and forwardly extending shank, a cross bar secured to the tongue and rigidly connected to the upper ends of the plow shanks, a second cross bar in rear of the first-mentioned cross bar, means for supporting and bracing the second cross bar from the frame and from the tongue, and means connecting said second cross bar with the intermediate portions of the plow shanks to brace the latter, each of said runners being lower than the plow which precedes it, so as to open a drill in the furrow left by the plow.

In testimony that I claim the foregoing as my own, I have hereto affixed my signature.

CARL ADOLPH DEMPEWOLF.